(12) United States Patent
Kaida et al.

(10) Patent No.: US 8,791,952 B2
(45) Date of Patent: *Jul. 29, 2014

(54) METHOD AND SYSTEM OF IMMERSIVE GENERATION FOR TWO-DIMENSION STILL IMAGE AND FACTOR DOMINATING METHOD, IMAGE CONTENT ANALYSIS METHOD AND SCALING PARAMETER PREDICTION METHOD FOR GENERATING IMMERSIVE SENSATION

(71) Applicant: Samsung Electronics Co., Ltd., Suwon-si (KR)

(72) Inventors: Xiao Kaida, Yongin-si (KR); Ji Young Hong, Seongnam-si (KR); Ho Young Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,840

(22) Filed: Apr. 30, 2013

(65) Prior Publication Data

US 2013/0235065 A1  Sep. 12, 2013

Related U.S. Application Data

(63) Continuation of application No. 11/968,892, filed on Jan. 3, 2008, now Pat. No. 8,462,169.

(30) Foreign Application Priority Data

Aug. 3, 2007 (KR) .................. 10-2007-0078097

(51) Int. Cl.
  *G09G 5/02* (2006.01)
(52) U.S. Cl.
  USPC ........... 345/589; 345/581; 345/590; 345/591; 345/592; 345/606; 345/617; 345/619

(58) Field of Classification Search
  None
  See application file for complete search history.

(56) References Cited

U.S. PATENT DOCUMENTS

| | | | |
|---|---|---|---|
| 5,987,094 | A | 11/1999 | Clarke et al. |
| 7,764,834 | B2 | 7/2010 | Simard et al. |
| 7,770,130 | B1 | 8/2010 | Kaptelinin |
| 2003/0152285 | A1 | 8/2003 | Feldmann et al. |
| 2005/0041949 | A1 | 2/2005 | Onuki et al. |
| 2005/0163212 | A1 | 7/2005 | Henson et al. |
| 2005/0281474 | A1 | 12/2005 | Huang |

FOREIGN PATENT DOCUMENTS

| | | |
|---|---|---|
| JP | 2001-75183 | 3/2001 |
| JP | 2002-245471 | 8/2002 |
| JP | 2003-271971 | 9/2003 |

OTHER PUBLICATIONS

U.S. Office Action issued Aug. 18, 2011 in copending U.S. Appl. No. 11/968,892.
U.S. Office Action issued Jan. 31, 2012 in copending U.S. Appl. No. 11/968,892.

(Continued)

*Primary Examiner* — Jwalant Amin
(74) *Attorney, Agent, or Firm* — Staas & Halsey LLP

(57) ABSTRACT

A system and method for generating immersive sensation for a two-dimensional still image is provided. The method for generating immersive sensation including: converting a color space of an inputted image; loading a background mask to separate a foreground image and a background image from the inputted image; achieving attribute information for each of the foreground image and the background image, based on a perceptual attribute with respect to the color space, via an image content analysis; predicting scaling parameters based on the attribute information; and enhancing the inputted image based on the scaling parameter.

11 Claims, 6 Drawing Sheets

(56) References Cited

OTHER PUBLICATIONS

U.S. Office Action issued Jun. 19, 2012 in copending U.S. Appl. No. 11/968,892.

U.S. Office Action issued Oct. 24, 2012 in copending U.S. Appl. No. 11/968,892.

U.S. Notice of Allowance issued Feb. 1, 2013 in copending U.S. Appl. No. 11/968,892.

Japanese Office Action issued Sep. 25, 2012 in corresponding Japanese Patent Application No. 2008-006260.

Chinese Office Action issued Oct. 23, 2009 in corresponding Chinese Patent Application No. 200810086765.6.

300

SATURATION ENHANCEMENT

METHOD AND SYSTEM OF IMMERSIVE GENERATION FOR TWO-DIMENSION STILL IMAGE AND FACTOR DOMINATING METHOD, IMAGE CONTENT ANALYSIS METHOD AND SCALING PARAMETER PREDICTION METHOD FOR GENERATING IMMERSIVE SENSATION

CROSS-REFERENCE TO RELATED APPLICATION

This application is a continuation of U.S. application Ser. No. 11/968,892, filed on Jan. 3, 2008, which claims the benefit of Korean Patent Application No. 2007-78097, filed on Aug. 3, 2007 in the Korean Intellectual Property Office, the disclosures of which are incorporated herein by reference in their entirety.

BACKGROUND OF THE INVENTION

1. Field

In a large sized display having a viewing angle of greater than 50 degrees such as an HDTV, a projection from a digital projector, and a movie screen, human's immersive sensation may be easily generated in comparison to a normal sized display due to its large size, the human's immersive sensation being combinations of more reality, full involvement and a strong feeling of being there. Regardless of a quality of the image, the human's immersive sensation enables us to have a favorable impression for an image.

2. Description of the Related Art

It is difficult to feel an immersive sensation in a normal sized display having a viewing angle of less than 30 degrees in comparison to a large sized display playing the same image or same video contents. The most important reason for differences in viewing angle is because of different sizes of displays. That is, viewing angles differ depending on physical size differences of displays. As an example, in a large sized display, a viewing angle is great and covers most portions of a retina. Conversely, in a comparatively smaller sized display, a viewing angle is less and only covers only a small portion of the retina.

SUMMARY

Aspects of the present invention provide a method and system for generating an immersive sensation for an image for a normal sized display by dominating each of four independent factors which are respectively used for each of a foreground and a background image.

Aspects of the present invention also provide a method for generating immersive sensation which can achieve attribute information by using perceptual attributes which includes brightness (or lightness), saturation (or chroma), and hue, and can generate an immersive sensation for a normal sized display since a scaling parameter is predicted based on the attribute information, and each of four independent factors is dominated.

According to an embodiment of the present invention, there is provided a method for generating immersive sensation for an image including: converting a color space of an inputted image; loading a background mask to separate a foreground image and a background image from the inputted image; achieving attribute information for each of the foreground image and the background image, based on a perceptual attribute with respect to the color space, via an image content analysis; predicting scaling parameters based on the attribute information; and enhancing the inputted image based on the scaling parameter.

According to an aspect of the present invention, the converting of the color space of the inputted image may convert the color space including a red green blue (RGB) digital signal into a color space including the perceptual attribute, and the perceptual attribute comprises brightness, saturation, and hue.

According to an aspect of the present invention, the loading of the background mask to separate the foreground image and the background image from the inputted image may separate the foreground image and the background image from the inputted image, and separates the foreground image and the background image from the inputted image based on color information and frequency information of the inputted image.

According to an aspect of the present invention, the perceptual attribute may include at least one of brightness, saturation, and hue of the foreground image and the background image, and the achieving of the attribute information for each of the foreground image and the background image, based on the perceptual attribute with respect to the color space, achieves the attribute information by analyzing the image content, based on the brightness, saturation, and hue.

According to an aspect of the present invention, the predicting of the scaling parameters based on the attribute information may predict the scaling parameters using at least one of a first ratio of the saturation difference to the brightness difference between the foreground image and the background image, a second ratio of the brightness difference to the saturation difference between the foreground image and the background image, and the average saturation of the foreground image.

According to an aspect of the present invention, the enhancing of the inputted image based on the scaling parameters may enhance the inputted image using at least one of brightness enhancement for the foreground image, saturation enhancement for the foreground image, contrast enhancement for the foreground image, and soft blurring for the background image.

According to an embodiment of the present invention, there is provided a method for dominating factors used for generating immersive sensation for an image including: separating a foreground image and a background image from an inputted image; and enhancing at least one of brightness, saturation, and contrast.

According to an embodiment of the present invention, there is provided a method for an image content analysis including: converting a color space of an inputted image; loading a background mask to separate a foreground image and a background image from the inputted image; and achieving attribute information for each of the foreground image and the background image based on a perceptual attribute with respect to the color space.

According to an embodiment of the present invention, there is provided a method for predicting scaling parameters including: achieving attribute information based on a perceptual attribute with respect to a converted color space of an inputted image; and predicting scaling parameters for each of a foreground and a background image of the inputted image based on the attribute information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DESCRIPTION OF THE EMBODIMENTS

Figure 1:
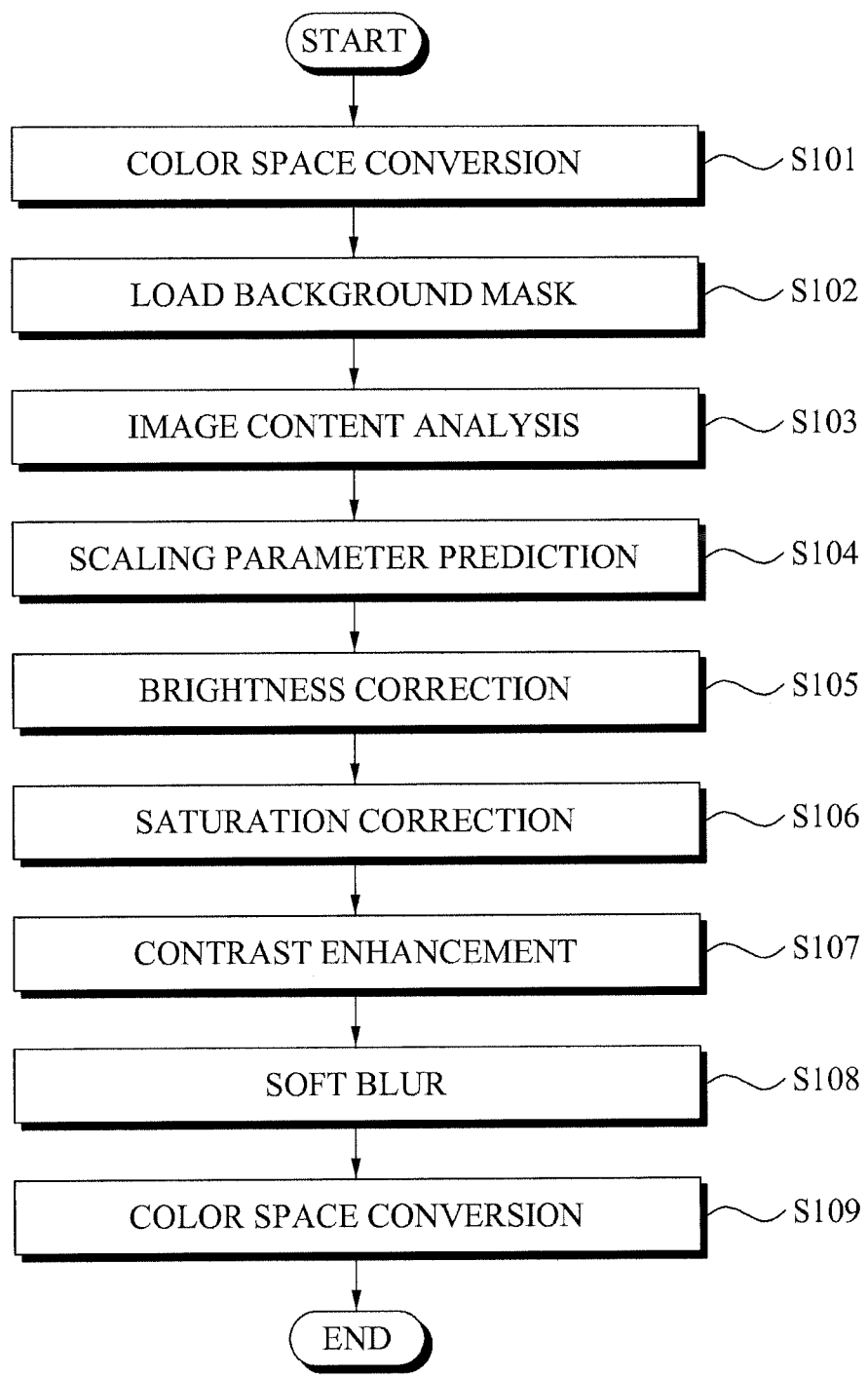
FIG. 1 is a flowchart illustrating a method for generating an immersive sensation according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

I. Background

The present invention relate to a color imaging enhancement method to generate a human immersive sensation for a normal sized display, such as an HDTV and digital projectors.

In a human used view system, a viewing angle is very important since the viewing angle displays quantity of information, which is transmitted to a human retina and brain. In this instance, it is well-known that visual responses are different with respect to different retina peculiarities. While a center of a retina is less sensitive to gradual increases of the retina peculiarities, most accurate information comes from the center of the retina. Therefore, a boundary of the image is comparatively blurred and less saturated than a center of the image, and due to this phenomenon, it is difficult to create a sensation of being immersed into the image when we view a large sized image.

However, the above-described phenomenon is not clearly demonstrated in a smaller sized image having a viewing angle of less than thirty degrees. Consequently, a foreground image and a background image can be easily distinguished as a size of a display is increased. Based on that, it is assumed that an immersive feeling for a two-dimensional (2D) still image can be generated by making the foreground image distinguished better from the background image. According to this assumption, a background image and a foreground image have to be considered separately for generating immersive sensation. In the case of a background image, soft blurring can be used for generating an immersive sensation; brightness and saturation can also be reduced in the background image in order to simulate an image with a greater viewing angle.

In addition, recent research has proved that with increase of a viewing angle of a display, an overall feeling that color may appear to be lighter and brighter, and contrast sensitivity would also appear be higher. Therefore, brightness, saturation, and contrast are needed to be enhanced to simulate a large sized display. To match these three factors to the above assumption, each factor is processed differently for a foreground image and a background image in order to achieve a greater difference between the foreground image and the background image. As an example, brightness or saturation enhancement may be used for a foreground image, whereas brightness or saturation enhancement of a background image may be decreased. Contrast enhancement is only applied to the foreground image.

These four factors, that is, soft blurring for a background image, contrast enhancement for a foreground image, and brightness and saturation correction for both foreground and background images, are either implemented individually or combine together for test images. For each factor, the same enhancement scale is adopted for all test images. A psychophysical experiment is conducted to verify performance of generating an immersive sensation for each method used by using a pair comparison method. A panel of observers compared a test image with each of produced images in terms of immersive generation. Based on results of the experiments, it is clearly demonstrated that each of the four processing can generate an immersive feeling, however the performance is highly dependent on image contents. Performance of combined factors is better than any single factor applied in terms of generating immersive sensation, which also implied that it is more reasonable a combination between the four factors will generate a more immersive feeling.

Therefore, the main objective of the present invention is to develop a method to automatically apply the four independent images processing in a foreground image or a background image according to image contents in purpose of generating immersive sensation for a normal size of a display. Since some researches have proved that reducing color information would make image less preferable, in the specification of the present, the background information is prevented from saturation and brightness process. Consequently, the four independent processes in the specification of the present invention as follows:

1. Saturation Enhancement for foreground image
2. Brightness Enhancement for foreground image
3. Contrast Enhancement for foreground image
4. Soft blurring for background image II. Immersive Sensation Generation Method Hereinafter, embodiments of the present invention will be described by referring to accompanied drawings.

In the present invention, special attention is paid to the immersive feeling generation by using image enhancement method for a normal size of a display. The four factors affecting the immersive sensation most are adopted and combined together for the 2D still image in order to achieve the immersive sensation as much as possible. Although image preference is not a main issue for the present invention, also images are a concern in immersive method development. However, in the method for generating immersive sensation, use of less preferable images is always avoided.

In the present invention, immersive sensation enhancement for an image is modeled based on three human perceptual attributes. Soft blurring for the image is applied for background image, while brightness, saturation, and contrast enhancement are applied for a foreground image. A content analysis for the image is adopted in order to assign different scaling parameters for different processing based on the image content.

FIG. 1 is a flowchart illustrating a method for generating immersive sensation according to an embodiment of the present invention.

In operation S101, a system for generating immersive sensation which generates immersive sensation for a two-dimensional (2D) still image converts a color space. That is, since the original color space such as a red-green-blue (RGB) digital signal does not correlated to a human visual system, the original color space cannot be directly used for immersive generation.

Therefore, human perceptual attributes such as brightness (or lightness), saturation (or chroma), and hue, which represent a final output in the human visual system, are employed for immersive generation. There are many color spaces that can be used to convert the RGB digital signal to the three human perceptual attributes for different applications using different fields. For example, 'CIECAM02' is mainly used for accurate color appearance prediction, 'CIELAB' is mainly used for color or image difference assessment, and 'HSV' is mainly used for color design and simple industry applications. In the present invention, all color spaces can be adopted to convert the RGB digital signal to human perceptual attributes.

As given in Table 1 below, different names and abbreviations of human perceptual attributes in each color space can be adopted. 'CIECAM02' is used to develop a mathematical model and an experiment assessment in the pilot study. Thus, an abbreviate 'J', 'C' and 'H' are used in the present invention. For different model applied, scaling parameters or thresholds would be different from that recommended in the present invention although a structure and equation recommended are same. For 'CIECAM02' or 'CIELAB', a device characterization which is used to build relationships between an RGB digital signal and CIE colorimetry (CIE XYZ) need to be performed. For different displays, different methods can be employed. In this instance, the two most common methods are a GOG (Gain-Offset-Gamma) model and a PLCC (Piecewise Linear interpolation assuming Constant Chromaticity coordinates) model. The former method is mainly used for devices having a linear or a power gamma curve, such as cathode-Ray Tube (CRT) displays. The latter method can be used for devices having an irregular gamut curve, i.e. a liquid crystal display (LCD) or organic light emitting diode (OLED) mobile displays.

TABLE 1

| Color space | Brightness | Saturation | Hue |
| --- | --- | --- | --- |
| CIECAM02 | Lightness(J) | Choma(C) | Hue(H) |
| CIELAB | Lightness(L) | Choma(C) | Hue(h) |
| HSV | Brightness(B or V) | Saturation(S) | Hue(H) |

In operation S102, the system for generating immersive sensation loads a background mask. The background mask can be used to separate a foreground image and a background image from an image. As an example, a digital number 1 is given for pixels in a background image, whereas a digital number 0 is given for pixels in a foreground image. The background separation has long been of interest in the field of image processing, and there are many methods which have been developed by different researches. In general, the background separation for a still image can be conducted using color information and frequency information in an image. Generally, a background image is generally more uniform and has a low frequency, whereas a foreground image generally has a complex content and has a higher frequency. In an embodiment of the present invention, the background separation is conducted by the following three steps: detecting background color information; detecting a background boundary based on the color information; and smoothing a background boundary.

In operation S103, the system for generating immersive sensation analyzes an image content. For different images, image contents can be significantly different. In the pilot study, it has been proven that performance of immersive generation by using four dominate factors are significant affected by the image content. That is, the performance of immersive enhancement would be different when a same image processing is applied to different images. Therefore, in order to enhance an immersive feeling as much as possible for each image, the image enhancement based on its image content is essential. Based on the embodiment of the present invention, it is found that an effectiveness of soft blurring is highly related to smoothness of background image, and performance of contrast enhancement is inversely related to saturation of a foreground image. Saturation and brightness enhancement are highly related to each other and cannot be taken as independent factors. Also, the performance is highly related to a ratio of a saturation difference and a brightness difference between the foreground image and the background image. Consequently, the image content analysis can be conducted by calculating the following information based on human perceptual attributes for images.

1. Average brightness ($J_M$) of foreground image
2. Average saturation ($C_M$) of foreground image
3. Brightness difference ($\Delta J$) between foreground image and background image
4. Saturation difference ($\Delta C$) between foreground image and background image
5. Image smoothness (S) of background image That is, based on the foreground image and the background image, $J_M$ and $C_M$ can be achieved by the average of brightness and saturation of the foreground image. Also, $\Delta J$ and $\Delta C$ can be calculated by using a difference of the average brightness and saturation between the foreground image and the background image.

In terms of image smoothness of the background image, the image smoothness is defined as a percentage of smooth pixels in the background image, while each smooth pixel represents a pixel that has the same appearance as its surrounding pixels. As an example, if an average color difference between a predetermined pixel and each of surrounding pixels is less than 1.5 $E_{CAM02}$, the predetermined pixel is considered as a smooth pixel and is represented as, $$\begin{cases} S_{x,y} = 1, & \dfrac{\sum_{i=-1,j=-1}^{i=1,j=1}\sqrt{(J_{x,y}-J_{x+i,y+i})^2 + (ac_{x,y}-ac_{x+i,y+i})^2 + (bc_{x,y}-bc_{x+i,y+j})^2}}{9} < 1.5 \\ S_{x,y} = 0, & \text{Otherwise} \end{cases}$$ [Equation 1]

As seen in Equation 1, 'CIELAB' color difference can be used if the applied color space is CIELAB; an RGB difference can be used if the applied color space is HSV. Then, smoothness of the background image is defined as a sum of smooth pixels divided into a sum of all pixels of the background image, which is represented by, $$S = \frac{\sum S_{x,y}}{\sum BP_{x,y}}, \quad \text{[Equation 2]}$$

where S represents the smoothness of the background image, $S_{x,y}$ represents the smooth pixel (x,y), BP represents the background pixel, and J, ac, and bc indicate color information from 'CIECAM02' for the pixel.

In operation S104, the system for generating immersive sensation predicts scaling parameters. Based on a content of each image, basic information can be summarized for immersive generation. In operation S104, the scaling parameters for each immersive generation factor are predicted based on the basic information from the content of each image.

For saturation enhancement, a scaling parameter ($K_{S1}$) is highly related to the ratio ($\Delta J/\Delta C$) of brightness difference and saturation difference between the foreground image and the background image when the ratio ($\Delta J/\Delta C$) is below a certain threshold. The scaling parameter ($K_{S1}$) generates a result of a greater saturation difference between the foreground image and the background image when a small scale is given, whereas a large scale is adopted when the saturation difference between the foreground image and the background image is small. The scale for the saturation ($K_{S1}$) is represented by, $$\begin{cases} K_S = 1 + \frac{\Delta J}{8\Delta C}, & 0 < \frac{\Delta J}{\Delta C} <= 2 \\ K_S = 1.5, & \frac{\Delta J}{\Delta C} > 2. \end{cases} \quad \text{[Equation 3]}$$

For brightness enhancement, a scaling parameter ($K_{B1}$) is highly related to a ratio ($\Delta C/\Delta J$) of the saturation difference and the brightness difference between the foreground image and the background image when the ratio is below the certain threshold. In this case, when a brightness difference between the foreground image and the background image is large, a small brightness scale is used, whereas a large scale is adopted when the brightness difference between the foreground image and the background image is small. Also, a linear relationship is used to predict the scale of brightness ($K_{B1}$), which is represented by, $$\begin{cases} K_{B1} = -\frac{\Delta C}{400\Delta J}, & 0 < \frac{\Delta C}{\Delta J} \leq 2 \\ K_{B1} = -0.005, & \frac{\Delta C}{\Delta J} > 2. \end{cases} \quad \text{[Equation 4]}$$

For contrast enhancement, a scaling parameter ($K_{CS1}$) is highly related to the average saturation of the foreground image. When the image has high saturation in it's foreground, a small contrast enhancement is expected for immersive generation, whereas a large contrast enhancement is expected when the foreground image is more neutral. The scaling parameter ($K_{CS1}$) for contrast enhancement can be predicted using a linear function represented as $$\begin{cases} K_{CS1} = -0.00017 C_M + 0.005, & C_M \leq 40 \\ K_{CS1} = 0, & C_M > 40. \end{cases} \quad \text{[Equation 5]}$$

For soft blurring, the smoothness S of the background image is directly used to be a scaling parameter.

In operation S105, the system for generating immersive sensation enhances brightness of the image. For a pixel in the foreground image, a power function is used for brightness enhancement which is represented as, $$J_{out} = K_{B1} J_{in}^2 + K_{B2} J_{in}, \text{ while } K_{B2} = 1 - 100 K_{B1}, \quad \text{[Equation 6]}$$

where $J_{in}$ and $J_{out}$ represent input and output brightness for this enhancement, and $K_{B1}$ and $K_{B2}$ represent scaling parameters.

Figure 2:
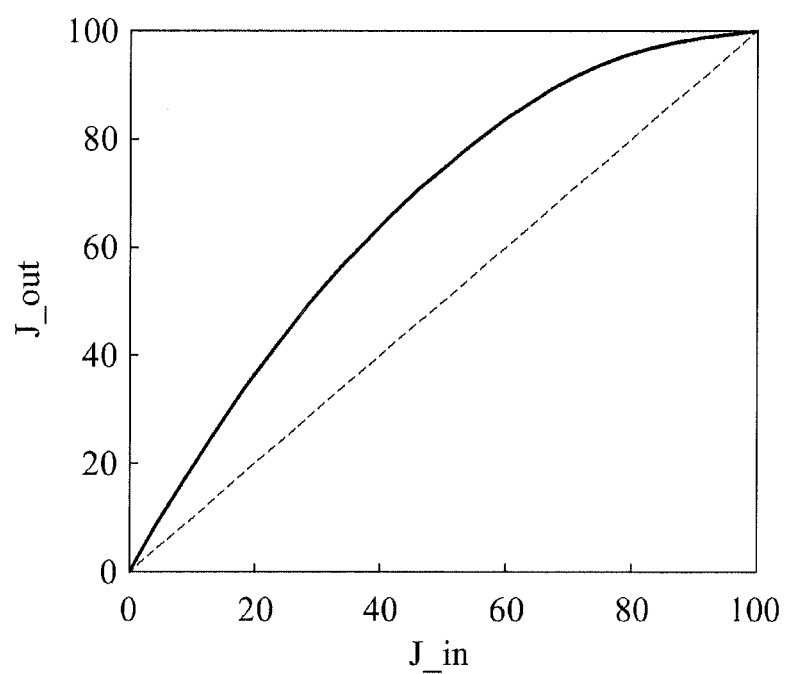
FIG. 2 is a graph illustrating brightness enhancement according to an embodiment of the present invention.

FIG. 2 is a graph 200 illustrating brightness enhancement according to an embodiment of the present invention. As shown in the graph 200, a power function is forced to pass point (0, 0) and (100,100). The point (0, 0) represents a dark point, whereas the point (100,100) represents a white point of a corresponding display. That is, the graph 200 demonstrates relation between input and output brightness.

In operation S106, the system for generating immersive sensation enhances saturation of the image. A linear function is employed for the saturation enhancement for each pixel in the foreground image, the linear function being represented by, $$C_{out} = K_S C_{in} \quad \text{[Equation 7]}$$

where $C_{in}$ and $C_{out}$ respectively represent the input and output saturation for the saturation enhancement, and $K_S$ represents the scaling parameters for the saturation enhancement.

Figure 3:
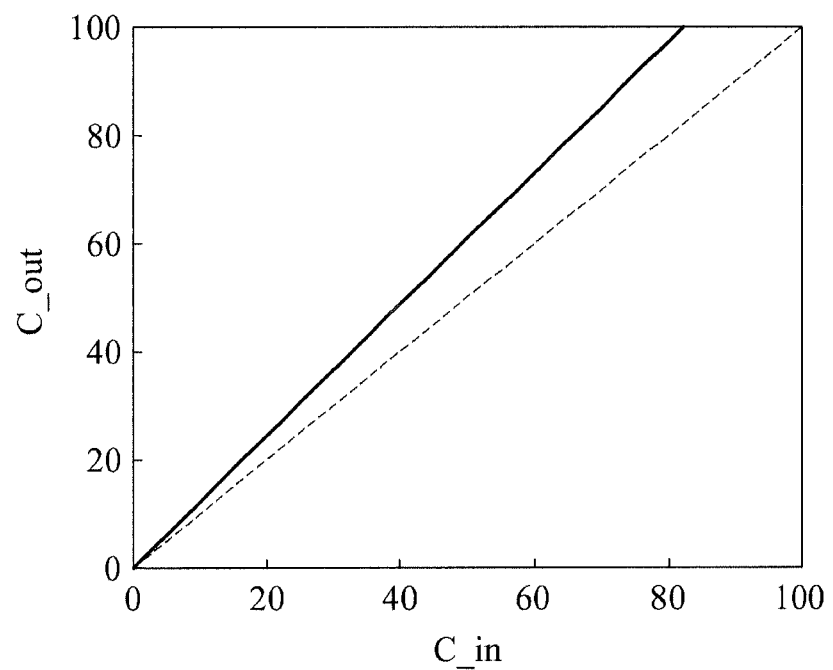
FIG. 3 is a graph illustrating saturation enhancement according to an embodiment of the present invention.

FIG. 3 is a graph 300 illustrating saturation enhancement according to an embodiment of the present invention. As shown in the graph 300, in Equation 7, the function is forced to point (0, 0) in Equation 7 since the saturation of the neutral color would not be changed by a size effect.

In operation S107, the system for generating immersive sensation enhances an image contrast. The contrast enhancement is performed for the foreground image as given in Equations 8 through 12. To increase contrast of the foreground image, brightness of relatively dark colors is reduced by a power function, whereas brightness of relative light colors is processed to be even greater. In this instance, the brightness of the relative dark colors is less than average brightness of the foreground image, and the brightness of the relative light colors is greater than the average brightness of the foreground image.

$$\begin{cases} J_{out} = K_{CS1} J_{in}^2 + K_{CS2} J_{in}, & J_{in} \leq J_M \\ J_{out} = K_{CL1} J_{in}^2 + K_{CL2} J_{in} + K_{CL3}, & J_{in} > J_M, \end{cases} \quad \text{[Equation 8]}$$

$$K_{CS2} = 1 - K_{CS1} J_M, \quad \text{[Equation 9]}$$

$$K_{CL1} = -K_{CS1}, \quad \text{[Equation 10]}$$

$$K_{CL2} = 1 + \frac{(10000 - J_M^2) K_{CL1}}{J_M - 100}, \text{ and} \quad \text{[Equation 11]}$$

$$K_{CL3} = 100 - 1000 K_{CL1} - 100 K_{CL2} \quad \text{[Equation 12]}$$

where $J_{in}$ and $J_{out}$ represent input and output brightness for this processing, $J_M$ represents the mean brightness of the foreground image, $K_{CS1}$ and $K_{CS2}$ represent the scaling parameters for brightness less than $J_M$, and $K_{CL1}$, $K_{CL2}$, and $K_{CL3}$ represent the scaling parameters when brightness is greater than $J_M$.

Figure 4:
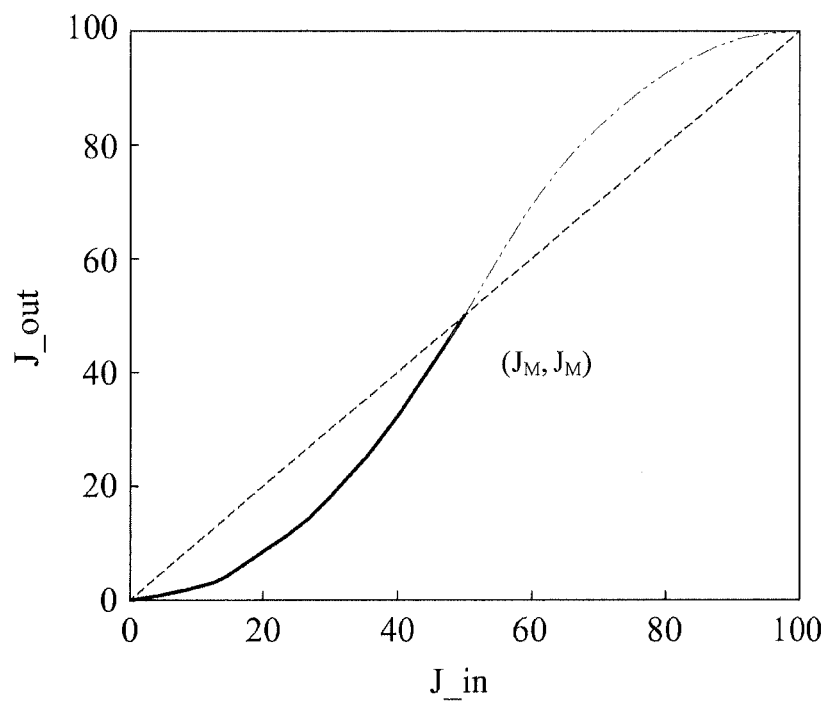
FIG. 4 is a graph illustrating for contrast enhancement according to an embodiment of the present invention.

FIG. 4 is a graph 400 illustrating contrast enhancement according to an embodiment of the present invention. As shown in the graph 400, when the brightness is less than $J_M$, the power function passes points (0, 0) and ($J_M$, $J_M$), otherwise the power function passes points ($J_M$, $J_M$) and (100, 100).

In operation S108, the system for generating immersive sensation performs soft blurring with respect to the background image. In this instance, the soft blurring for the background image is performed using a mean filter. The mean filter filters each pixel of the background image. The scale processing depends on smoothness S of the background image. When smoothness S is greater than 80%, there is no performing of the soft blurring. As an example, a 3×3 mean filter is used on the background image when smoothness S is between 50% and 80%, and a 5×5 mean filter is used on the background image when smoothness is less than 50%.

In operation S109, the system for generating an immersive sensation converts the color space.

After the image enhancement, $J_{out}$, $C_{out}$, and $H_{out}$ predicted for both the foreground and the background image are generated and combined together to generate a new immersive image. Next, the color space conversion needs to be conducted in order to convert human perceptual attributes to RGB digital signals. For 'CIECAM02' or 'CIELAB' color space, an inverse color appearance model needs to be performed, and also a device characterization model needs to be performed.

As described above, by using the operations S101 through S109, an immersive sensation can be generated.

Figure 5:
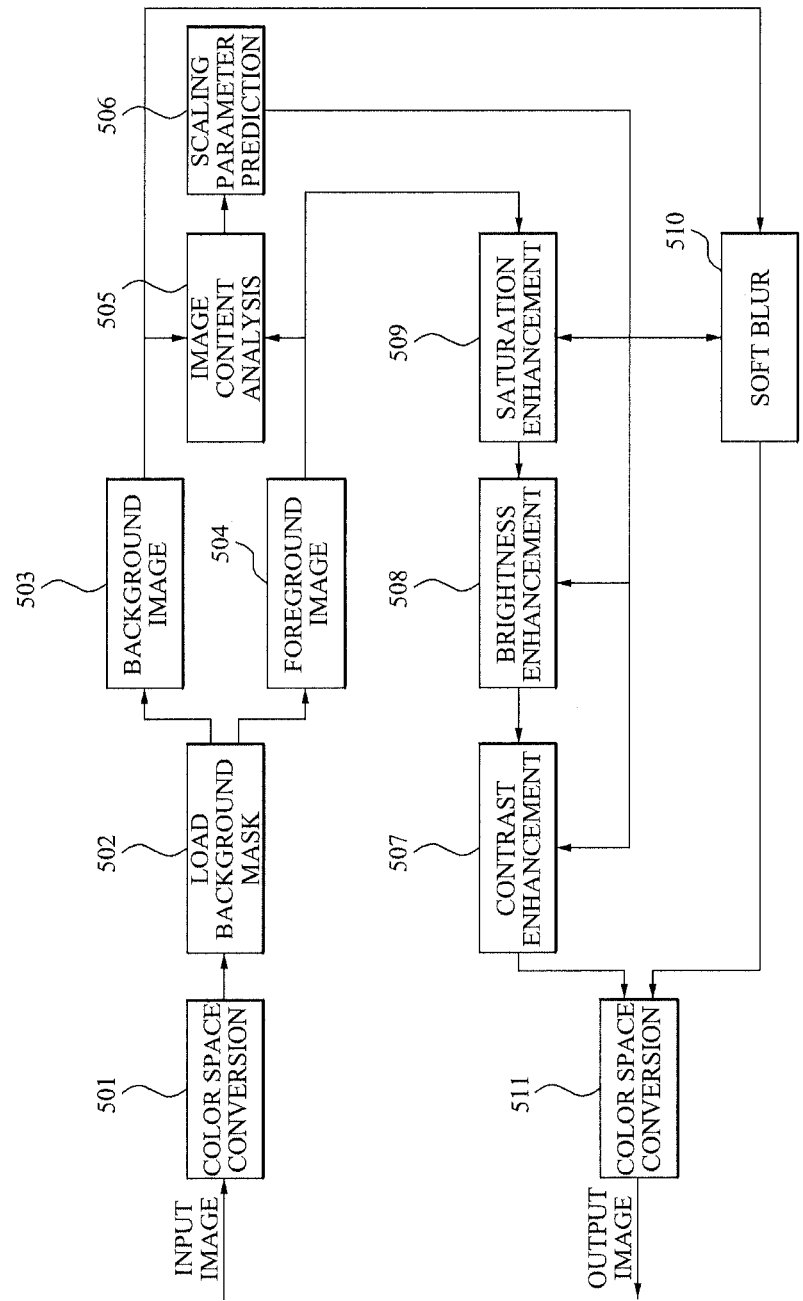
FIG. 5 is a block diagram illustrating a method for an generating immersive sensation according to an embodiment of the present invention.

FIG. 5 is a block diagram illustrating a method for generating immersive sensation according to an embodiment of the present invention.

The system for generating immersive sensation of FIG. 5 may process the color space conversion 501 by inputting Rin, Gin, and Bin for input images. That is, the system for generating immersive sensation may convert the original color space to a color space having human perceptual attributes, such as brightness (or lightness), saturation (or chroma), and hue, since an original color space such as an RGB digital signal does not correlate to a human visual system and the original color space cannot be directly used for immersive generation.

In this instance, output of the color space conversion 501 may have values J, C, and H in the case of the color space 'CIECAM02' as described above, and the system for generating immersive sensation may load a background mask 502 with respect to the output of the color space conversion 501, and may separate a background image 503 and a foreground image 504. That is, J, C, and H may be separated into the background image 503 represented as $J_B$, $C_B$, and $H_B$, and the foreground image 504 represented as $J_F$, $C_F$, and $H_F$.

As described above, information based on human perceptual attributes may be achieved via an image content analysis 505, and the separated background image 503 and the separated foreground image 504. That is, by analyzing the $J_B$, $C_B$, $H_B$, $J_F$, $C_F$, and $H_F$, information based on the perceptual attributes, such as average brightness ($J_M$) of the foreground image 504, average saturation ($C_M$) of the foreground image 504, brightness difference (ΔJ) between the foreground image 504 and the background image 503, saturation difference (ΔC) between the foreground image 504 and the background image 503, and image smoothness (S) of the background image 503, can be achieved.

The information based on the perceptual attributes can be used for scaling parameter prediction 506. That is, by using Equations 3 through 5, scaling parameters necessary for contrast enhancement 507, brightness enhancement 508, and saturation enhancement 509 may be predicted. Soft blurring 510 may be performed using the image smoothness S and the background image 503.

More specifically, the system for generating immersive sensation may achieve first results $J_{F1}$, $C_{F1}$, and $H_{F1}$ using predicted scaling parameters $K_{C1}$, $K_{B1}$, and $K_{S1}$ and the foreground images 504 $J_F$, $C_F$, and $H_F$, and achieve second results $J_{B1}$, $C_{B1}$, and $H_{B1}$ using the image smoothness S and the background image 503, the scaling parameters being predicted from the contrast enhancement 507 and the brightness enhancement 508.

The system for generating immersive sensation converts the first results and the second results to RGB digital signals $R_{OUT}$, $G_{OUT}$, and $B_{OUT}$ via color space conversion 511, thereby generating an immersive sensation for an inputted image.

Figure 6:
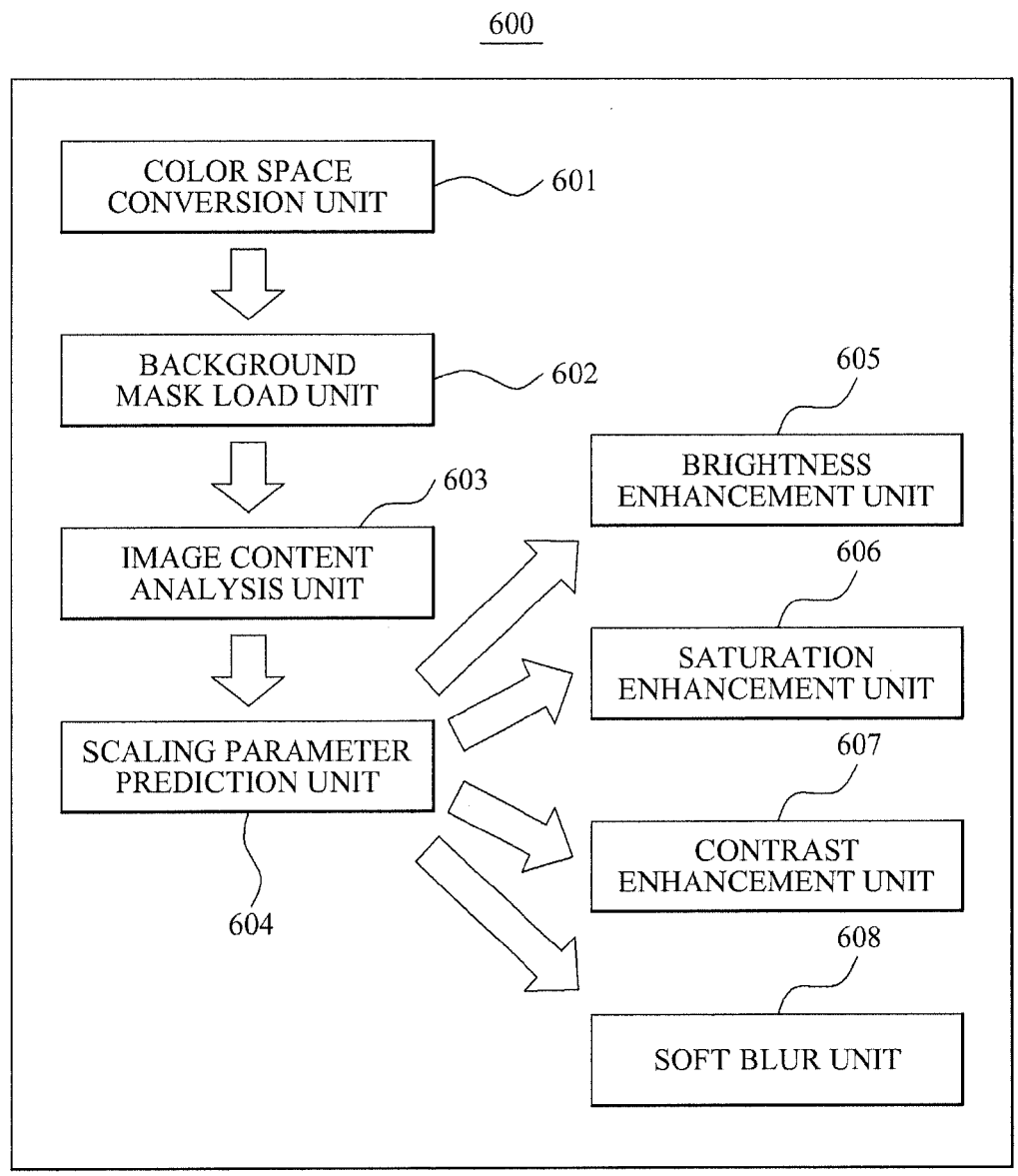
FIG. 6 is a block diagram illustrating an inner configuration of a system for generating an immersive sensation according to an embodiment of the present invention.

FIG. 6 is a block diagram illustrating an inner configuration of a system 600 for generating an immersive sensation according to an embodiment of the present invention. As illustrated in FIG. 6, the system 600 for generating an immersive sensation may include a color space conversion unit 601, a background mask load unit 602, an image content analysis unit 603, a scaling parameter prediction unit 604, a brightness enhancement unit 605, a saturation enhancement unit 606, a contrast enhancement unit 607, and a soft blur unit 608.

The color space conversion unit 601 converts a color space. That it, since an original color space such as a red-green-blue (RGB) digital signal does not correlated to a human visual system, the original color space can not be directly used for immersive generation.

Therefore, human perceptual attributes such as brightness (or lightness), saturation (or chroma), and hue, which represent a final output in the human visual system, are employed for immersive generation. There are many color spaces that can be used to convert the RGB digital signal to the three human perceptual attributes for different applications using different fields. For example, 'CIECAM02' is mainly used for accurate color appearance prediction, 'CIELAB' is mainly used for color or image difference assessment, and 'HSV' is mainly used for color design and simple industry applications. In the present invention, all color spaces can be adopted to convert the RGB digital signal to human perceptual attributes.

The background mask load unit 602 loads a background mask. In this instance, the background mask may be used for separating a foreground image and a background image. As an example, a digital number 1 is given for pixels in the background image, whereas a digital number 0 is given for pixels in the foreground image. The background separation has long been of interest in the field of image processing, and there are many methods which have been developed by different researches. In general, the background separation for a still image can be conducted using color information and frequency information in an image. Generally, a background image is generally more uniform and has a low frequency, whereas a foreground image generally has a complex content and has a higher frequency. In an embodiment of the present invention, the background separation is conducted by the following three steps; detecting color information of a background image; detecting a boundary of the background image based on the color information; and smoothing a background boundary.

The image content analysis unit 603 analyzes an image content. For different images, image contents can be significantly different. In the pilot study, it has been proven that performance of immersive generation by using four dominate factors are significantly affected by the image content. That is, the performance of immersive enhancement would be different when a same image processing is applied to different images. Therefore, in order to enhance an immersive feeling as much as possible for each image, the image enhancement based on its image content is essential.

An effectiveness of soft blurring is highly related to smoothness of a background image and performance of contrast enhancement is inversely related to saturation of a foreground image. Also, saturation and brightness enhancement are highly related to each other and cannot be taken as independent factors. Also, the performance is highly related to a ratio of a saturation difference and a brightness difference between the foreground image and the background image. Consequently, the system for generating immersive sensation may conduce to the following information based on human perceptual attributes for images via the image content analysis.

1. Average brightness ($J_M$) of foreground image
2. Average saturation ($C_M$) of foreground image
3. Brightness difference ($\Delta J$) between foreground image and background image
4. Saturation difference ($\Delta C$) between foreground image and background image
5. Image smoothness (S) of background image That is, based on the foreground image the background image, $J_M$ and $C_M$ can be achieved by using an average of brightness and saturation of the foreground image. Also, $\Delta J$ and $\Delta C$ can be calculated by using a difference of the average brightness and saturation between the foreground image and the background image.

In terms of image smoothness of the background image, the image smoothness is defined as a percentage of smooth pixels in the background image, while each smooth pixel represents a pixel that has the same appearance as its surrounding pixels. As an example, if an average color difference between a predetermined pixel and each of surrounding pixels is less than 1.5 $E_{CAM02}$, the predetermined pixel is considered as a smooth pixel. (see Equation 1)

As seen in Equation 1, 'CIELAB' color difference can be used if the applied color space is CIELAB; an RGB difference can be used if the applied color space is HSV. Then, smoothness of the background image is defined as a sum of smooth pixels divided into a sum of all pixels of the background image, which is represented in Equation 2 above.

From Equations 1 and 2, S represents the smoothness of the background image, $S_{x,y}$ represents the smooth pixel (x,y), BP represents the background pixel, and J, ac, and bc indicate color information from 'CIECAM02' for the pixel.

The scaling parameter prediction unit 604 predicts scaling parameters. Based on a content of each image, basic information can be summarized for immersive generation. The scaling parameter prediction unit 604 may predict the scaling parameters for each immersive generation factor based on the basic information from the content of each image.

For saturation enhancement, a scaling parameter ($K_{S1}$) is highly related to a ratio ($\Delta J/\Delta C$) of brightness difference and saturation difference between the foreground image and the background image when the ratio ($\Delta J/\Delta C$) is below a certain threshold. The scaling parameter prediction unit 604 generates a result that a large saturation difference between the foreground image and the background image when a small scale is given, whereas a large scale is adopted when saturation difference between the foreground image and the background image is small. The scale for the saturation ($K_{S1}$) may be predicted as shown in Equation 3.

For brightness enhancement, a scaling parameter ($K_{B1}$) is highly related to a ratio ($\Delta C/\Delta J$) of the saturation difference and the brightness difference between the foreground image and the background image when the ratio is below the certain threshold. In this case, when a brightness difference between the foreground image and the background image is large, a small brightness scale is used, whereas a large scale is adopted when the brightness difference between the foreground image and the background image is small. Also, a linear relationship is used to predict the scale of brightness ($K_{B1}$) as shown in Equation 4.

For contrast enhancement, a scaling parameter ($K_{CS1}$) is highly related to the average saturation of the foreground image. When the image has high saturation in it's foreground, a small contrast enhancement is expected for immersive generation, whereas a large contrast enhancement is expected when the foreground image is more neutral. The scaling parameter ($K_{CS1}$) for contrast enhancement can be predicted using a linear function as shown in Equation 5.

For soft blur, the smoothness S of the background image is directly used to be a scaling parameter.

The brightness enhancement unit 605 enhances brightness of the image. For a pixel in the foreground image, a power function is used for the brightness enhancement as shown in Equation 6. The power function may be forced to pass points (0, 0) and (100, 100). The point (0, 0) represents a dark point, whereas the point (100,100) represents a white point of a corresponding display.

The saturation enhancement unit 606 enhances saturation of the image. In this instance, a linear function is employed for the saturation enhancement for each pixel in the foreground image, as shown in Equation 7.

From Equation 7, $C_{in}$ and $C_{out}$ respectively represent input and output saturation for the saturation enhancement, and $K_S$ represents the scaling parameters for the saturation enhancement. In Equation 7, the function is forced to pass the point (0, 0) since the saturation of the neutral color would not be changed by a size effect.

The contrast enhancement unit 607 enhances contrast of the image. In this instance, the contrast enhancement is performed for the foreground image as given in Equations 8 through 12. To increase contrast of the foreground image, brightness of relative dark colors is reduced by a power function, whereas brightness of relative light colors is processed to be even greater. In this instance, the brightness of the relative dark colors is less than average brightness of foreground image, and the brightness of the relative light colors is greater than the average brightness of the foreground image. When the brightness is less than $J_M$, the power function passes points (0, 0) and ($J_M$, $J_M$), otherwise the power function passes points ($J_M$, $J_M$) and (100, 100).

The soft blur unit 608 performs soft blurring with respect to the background image. In this instance, the soft blurring for the background image is performed using a mean filter. The mean filter filters each pixel of the background image. The scale processing depends on smoothness S of the background image. When smoothness S is greater than 80%, there is no processing for the soft blur. As an example, a 3×3 mean filter is used on the background image when smoothness S is between 50% and 80%, and a 5×5 mean filter is used on the background image when smoothness is less than 50%.

After the image enhancement, the color space conversion unit 601 may combine $J_{out}$, $C_{out}$, and $H_{out}$ being predicted with respect to the foreground image and the background image in order to generate a new immersive image. Then, the color space conversion needs to be conducted in order to convert human perceptual attributes to RGB digital signals.

As described above, by using the system and method for generating immersive sensation of the present invention, an immersive sensation may be generated for a normal sized display by dominating each of independent four factors, which is used for a background image and a foreground image of an image.

A method for dominating each of factors which is used for immersive generation for an image and a method for predicting a scaling parameter will be omitted since the methods are described from the above.

The method for generating immersive sensation according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, it is possible to generate an immersive sensation for a normal size display by dominating each of four independent factors.

Also, according to the present invention, it is possible to achieve attribute information by using perceptual attributes which includes brightness (or lightness), saturation (or chroma), and hue, and to generate an immersive sensation for a normal sized display since a scaling parameter is predicted based on the attribute information, and each of four independent factors is dominated.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A method for dominating factors used for generating immersive sensation for an image, comprising:
separating a foreground image and a background image from an inputted image;
enhancing at least one of brightness, saturation, and contrast; and
performing a soft blurring for the background image,
wherein the soft blurring is performed using image smoothness of the background image,
wherein the image smoothness comprises a percentage of a smooth pixel in the background image, and the smooth pixel is determined using an average color difference with surrounding pixels.

2. The method of claim 1, wherein the separating of the foreground image and the background image from the inputted image comprises:
converting a color space of the inputted image; and
loading a background mask to separate the foreground image and the background image from the inputted image.

3. The method of claim 1, wherein the enhancing of the at least one of brightness, saturation, and contrast comprises:
achieving attribute information for each of the foreground image and the background image, based on a perceptual attribute with respect to the color space, via an image content analysis; and
predicting scaling parameters based on the attribute information,
wherein the enhancing of the inputted image is based on the scaling parameter.

4. The method of claim 3, wherein the perceptual attribute comprises at least one of brightness, saturation, and hue of the foreground image and the background image, and the achieving of the attribute information for each of the foreground image and the background image, based on the perceptual attribute with respect to the color space, achieves the attribute information via the image content analysis, based on the brightness, saturation, and hue.

5. The method of claim 4, wherein the attribute information comprises at least one of average brightness of the foreground image, average saturation of the foreground image, a brightness difference between the foreground image and the background image, a saturation difference between the foreground image and the background image, and image smoothness of the background image.

6. The method of claim 3, wherein the predicting of the scaling parameters based on the attribute information predicts the scaling parameters using at least one of a first ratio of the saturation difference to the brightness difference between the foreground image and the background image, a second ratio of the brightness difference to the saturation difference between the foreground image and the background image, and the average saturation of the foreground image.

7. The method of claim 3, wherein the enhancing of the inputted image based on the scaling parameters enhances the inputted image using at least one of brightness enhancement for the foreground image, saturation enhancement for the foreground image, contrast enhancement for the foreground image, and soft blurring for the background image.

8. A method for an image content analysis, comprising:
converting a color space of an inputted image;
loading a background mask to separate a foreground image and a background image from the inputted image;
achieving attribute information for each of the foreground image and the background image based on a perceptual attribute with respect to the color space; and performing a soft blurring for the background image,
wherein the soft blurring is performed using image smoothness of the background image,
wherein the image smoothness comprises a percentage of a smooth pixel in the background image, and the smooth pixel is determined using an average color difference with surrounding pixels.

9. The method of claim 8, wherein the converting of the color space of the inputted image converts the color space including a red green blue (RGB) digital signal into a color space including the perceptual attribute, and the perceptual attribute comprises at least one of brightness, saturation, and hue.

10. The method of claim 8, wherein the perceptual attribute comprises at least one of brightness, saturation, and hue of the foreground image and the background image, and the achieving of the attribute information for each of the foreground image and the background image, based on the perceptual attribute with respect to the color space, achieves the attribute information by analyzing the image content, based on the brightness, saturation, and hue.

11. The method of claim 10, wherein the attribute information comprises at least one of average brightness of the foreground image, average saturation of the foreground image, a brightness difference between the foreground image and the background image, a saturation difference between the foreground image and the background image, and image smoothness of the background image.

* * * * *